United States Patent [19]

Roach

[11] Patent Number: 4,790,139
[45] Date of Patent: Dec. 13, 1988

[54] RETROFIT TURBOCHARGER BOOSTER

[76] Inventor: James L. Roach, 3133 Auburn Rd., Auburn Hills, Mich. 48057

[21] Appl. No.: 66,973

[22] Filed: Jun. 29, 1987

[51] Int. Cl.⁴ .......................................... F02B 37/12
[52] U.S. Cl. .................................. 60/602; 251/129.01; 251/129.05
[58] Field of Search ................. 60/600, 601, 602, 603; 251/129.01, 129.05, 129.08

[56] References Cited

U.S. PATENT DOCUMENTS

| | | |
|---|---|---|
| 3,827,236 | 8/1974 | Rust . |
| 4,038,558 | 7/1977 | Gallois . |
| 4,387,571 | 6/1983 | Katsumata et al. ................... 60/602 |
| 4,461,149 | 7/1984 | Suzuki ................................. 60/602 |
| 4,474,007 | 10/1984 | Kronogard et al. . |
| 4,477,875 | 10/1984 | Suzuki et al. ........................ 60/602 |
| 4,498,443 | 2/1985 | Hasengawa et al. . |
| 4,557,238 | 12/1987 | Kuehnl . |
| 4,603,552 | 8/1986 | Kido . |

*Primary Examiner*—Michael Koczo
*Attorney, Agent, or Firm*—Brooks & Kushman

[57] ABSTRACT

A retrofit turbocharger booster (10) for a solenoid (19) controlled turbocharger (20) having a wastegate (28) which opens and closes in response to a pulse train generated by an engine control module (44). The turbocharger booster (10) includes first and second connectors (12) and (13) that are connected by first and second wires (15) and (16) to a diode (18) between the engine control module (44) and the solenoid (19). The diode (18) modifies the pulse train of the engine control module (44) extending the "on" pulses of the pulse train. The diode (18) is reverse biased relative to the engine control module (44) pulse train.

12 Claims, 2 Drawing Sheets

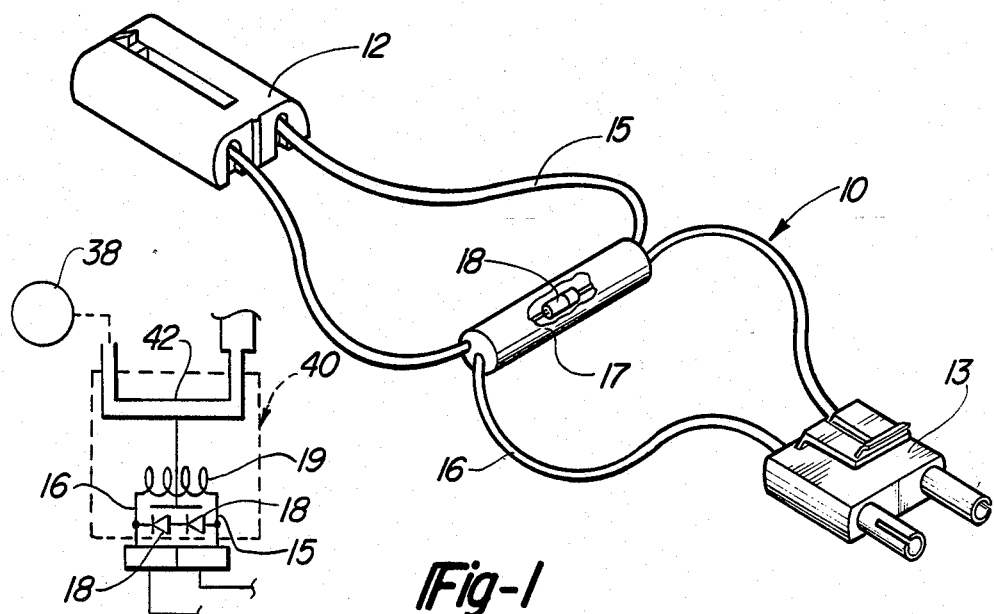
Fig-1
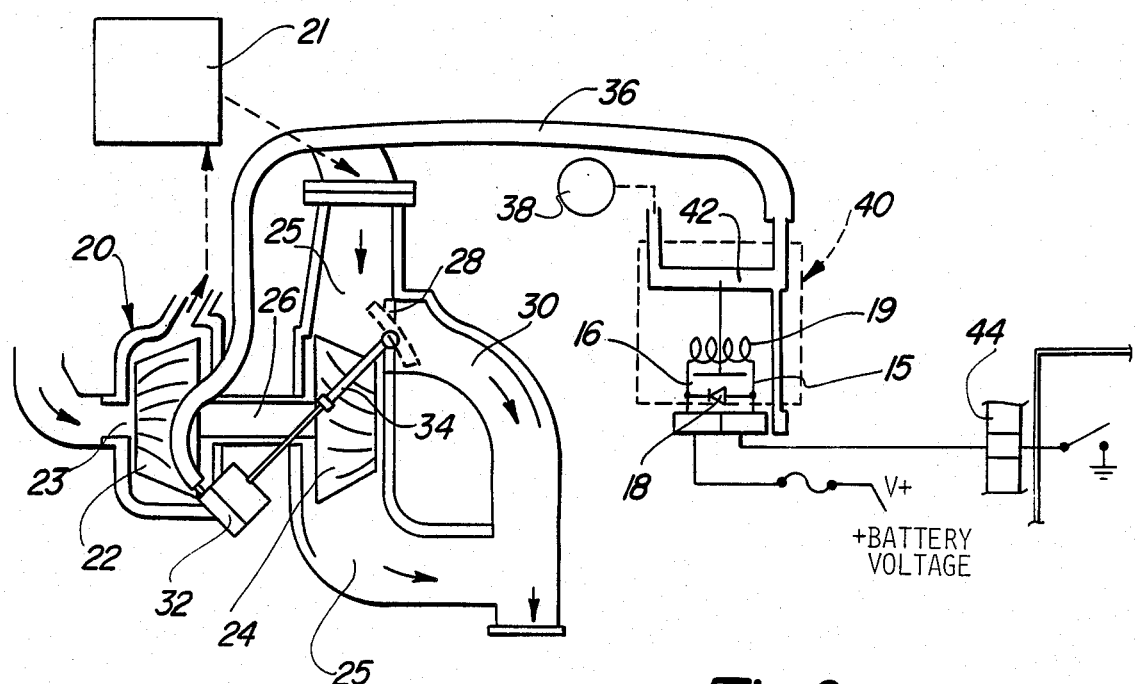
Fig-2a
Fig-2

RETROFIT TURBOCHARGER BOOSTER

TECHNICAL FIELD

The present invention relates to control apparatus for a fluid motor for increasing the quantity of air supplied to an internal combustion engine that is driven by an engine exhaust actuated motor.

BACKGROUND ART

Turbochargers increase the volumetric efficiency and power output performance of an internal combustion engine. Turbochargers function by increasing the pressure of the air supplied to the engine. Turbochargers are popular optional equipment on high performance vehicles because they provide faster response upon acceleration and greater horsepower.

Briefly, a turbocharger is an air pump which provides a compressed charge of air to the combustion chamber of the engine. In current automotive turbochargers, the turbocharger is a turbine that supplies compressed air to the throttle body unit or intake manifold, of an internal combustion engine. The compressor is connected by a shaft to an exhaust gas turbine. Exhaust gas exiting the engine rapidly rotates the exhaust gas turbine. The exhaust gas turbine turns the shaft and rotates the air compressor.

The boost pressure achieved by the turbocharger is controlled to protect the engine. Boost pressure is controlled by a wastegate that permits exhaust gases to bypass the exhaust gas turbine. The wastegate is operated by an actuator which opens and closes the wastegate. The actuator is operated by vacuum or pressurized fluid. The actuator is controlled by a pulse train generated by the engine control module, or on-board computer.

The engine control module pulse train is received by a solenoid-controlled vacuum valve. The pulse train energizes and de-energizes the solenoid sequentially causing the actuator to open and close the wastegate. The wastegate opens to permit exhaust gases to byspass the exhaust gas turbine. Under normal driving conditions, the control solenoid is energized 100% of the tiem, closing off the manifold to the wastegate actuator. When the wastegate is closed, boost pressure increases rapidly. The manifold air pressure sensor monitors the increase in pressure and, if appropriate, signals the engine control module to pulse the wastegate control valve on and off. This pulsing on and off prevents an over boost condition on rapid acceleration.

With original equipment turbochargers, boost pressure increases to about 9 psi. Then the engine control module functions to inhibit further increase in boost pressure. This limited boost pressure is well within the limits of the engine's capabilities even at higher engine speeds. At lower engine speeds the limitation on maximum boost pressure is unnecessary because engine stress is not high at engine speeds of 2000 to 3500 rpms.

DISCLOSURE OF INVENTION

It is an object of the present invention to provide a retrofit turbocharger booster which further increases the speed of response upon acceleration and increases the maximum horsepower output of an internal combustion engine.

It is a further object to provide a retrofit turbocharger booster which does not require modification of the engine control module (ECM) and does not effect the ECM's monitoring of emissions or other engine operations. It is another important object to provide a retrofit turbocharger booster which is easy to install and remove if the additional boost is not required.

The present invention relates to a retrofit turbocharger booster for an internal combustion engine including a turbocharger. Turbochargers with which the present invention is useable have a compressor connected by a shaft to a turbine which is rotated by the flow of exhaust gases. The compressor is controlled by a wastegate that is opened and closed by an actuator. The actuator is controlled by pulsing on and off voltage received from the engine control. The booster comprises first and second conductors electrically connected to the solenoid and to a diode connected in parallel with the solenoid of the wastegate control valve. The diode is reverse biased by voltage applied by the engine control.

The retrofit turbocharger booster operable in the above described environment may also be characterized as a pulse modification means connected by first and second conductors to opposite poles of the wastegate solenoid. The first conductor is electrically connected to a voltage source while the second conductor is connected to ground through the engine control. The pulse modification means extends the duration of the "on" pulse of the pulsing voltage without causing any change in the pulsing on and off voltage provided by the control means.

Simply stated, the present invention relates to a turbocharger booster for a turbocharger having a wastegate control solenoid. The booster includes a first connector having two leads. The first connector is adapted to receive the receptacle connector of the turbocharger wastegate control solenoid. A second connector having two leads is adapted to be received by a receptacle of a turbocharger wastegate control solenoid. The turbocharger includes means for generating a digital pulse train of "on" pulses and "off" pulses responsive to predetermined turbocharger control requirements. The booster comprises a pulse train modifier means for permitting current generated by the collapse of the magnetic field of the solenoid to flow back through the solnoid during the "off" pulses thereby effectively extending the "on" pulses. The pulse train modifier is connected to the solenoid so that current flow is prevented through the pulse train modifier during the "on" pulses received from the control means and the pulse train generated by the control means is not changed.

The turbocharger booster preferably utilizes a diode having an actuation barrier of between 0.2 and 0.8 volts. The degree of extenuation of the "on" pulses may be controlled by varying the actuation barrier level of the diode selected or by connecting several diodes in series to provide the desired increase in turbocharger boost.

The greatest increase in performance achieved by the simple circuit modification of the invention unexpectedly occurs during acceleration from 2000 to 4000 rpms. This is precisely when an extra boost is most desirable to overcome inertia. At higher engine speeds when increment of extra boost pressure is reduced it is less important to performance. Another inherent advantage is that stress on the engine at high engine speeds is not unduly increased.

These other advantages will be apparent upon studying the attached description of the best mode for carrying out the invention in view of the attached drawings.

BRIEF DESCRIPTION OF THE DRAWINGS

FIG. 1 is a perspective view of a retrofit turbocharger booster made in accordance with the present invention;

FIG. 2 is a schematic diagram of a turbocharger and wastegate control including the turbocharger booster of the present invention;

FIG. 2a is a fragmentary schematic diagram of a turbocharger booster having an additional diode connected in series;

BEST MODE FOR CARRYING OUT THE INVENTION

Figure 3:
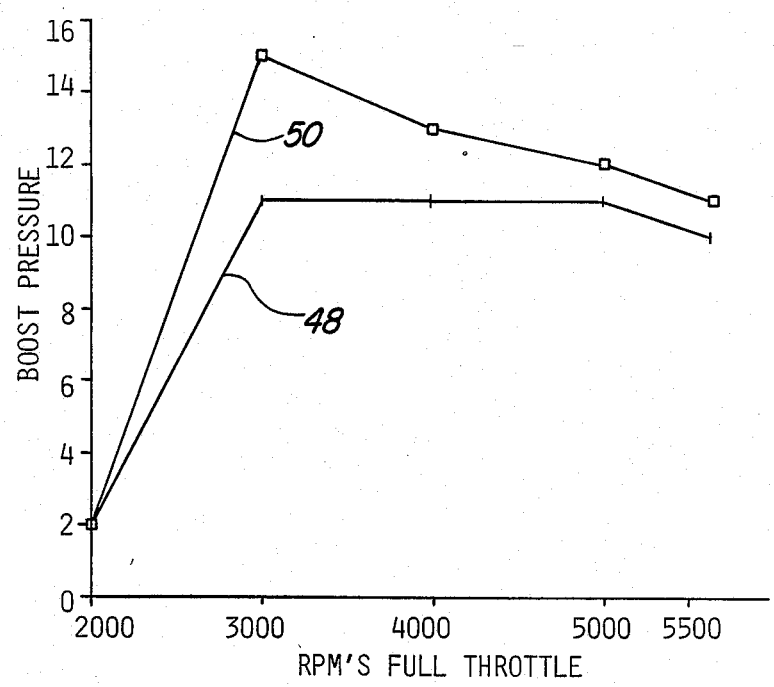
FIG. 3 is a graph showing boost pressure as a function of engine speed at full throttle of a turbocharger having the retrofit turbocharger booster compared to normal operation.

Referring now to FIG. 1, the retrofit turbocharger booster generally indicated by reference numeral 10 is shown to include a female connector 12 and a male connector 13 which are connected by first and second wires 15, 16 to a pulse modification means, or diode 18, contained in a housing 17.

Referring now to FIG. 2, a wastegate controlled turbocharger including the turbocharger booster 10 of the present invention is shown. The turbocharger booster 10 comprises a diode 18, or pulse modification means, connected by the first and second wires 15 and 16 to a solenoid 19. The diode 18 is located within the housing 17 shown in FIG. 1.

The solenoid 19 is the normal control solenoid for the turbocharger, generally indicated by reference numeral 20 in FIG. 2. The turbocharger 20 is provided to increase the air pressure provided to an internal combustion engine 21. Compressor 22 is a rotational impeller located in the air intake duct 23. An exhaust gas turbine 24 is located in the exhaust manifold 25. Exhaust gas turbine 24 is rotated by the flow of exhaust gases through the exhaust manifold. The exhaust gas turbine 24 is connected to the compressor 22 by shaft 26.

Turbocharger boost pressure is controlled by a wastegate 28 located in the exhaust manifold upstream from the exhaust gas turbine 24. The wastegate 28 is moveable between a closed position and an open position. When closed, the exhaust gases from the internal combustion engine 21 are routed through the exhaust gas turbine to provide increased boost pressure. When the wastegate 28 is open, exhaust gas is directed around the exhaust gas turbine 34 and through a bypass 30.

The wastegate 28 is operated by a wastegate actuator 32. The wastegate actuator 32 includes a cylinder 34, or linear motor, which is extended and retracted to move the wastegate 28 between open and closed positions.

The wastegate actuator 32 is connected to a vacuum tube 36 which provides control vacuum, or pressure, to the cylinder 34. The vacuum tube 36 is connected to a source 38 of vacuum or pressure through a control valve 40. In the preferred embodiment the source of vacuum 38 is the engine intake manifold. The valve 40 includes a port 42 which is opened and closed by solenoid 19 in response to the voltage applied by the ECM 44.

Figure 4:
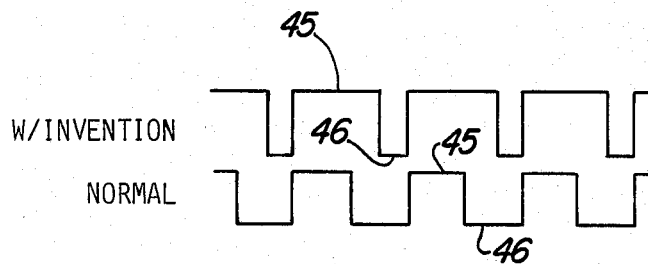
FIG. 4 is a pulse train diagram showing the wastegate control signal with the retrofit turbocharger booster as compared to normal operational.

Referring now to FIG. 4, two exemplary pulse trains are shown that illustrate the square wave received from the ECM by the solenoid 19. The square wave includes an "on" condition 45 and an "off" condition 46. The "on" condition corresponds to the engine control voltage (normally 12 volts DC) and the "off" condition corresponds to the base or 0 volts. The normal pulse train and pulse train with the turbocharger booster have the same period but the. turbocharger booster extends the duration of the "on" conditon 45.

The turbocharger booster 10 utilizes the voltage produced by the solenoid when the turbocharger control solenoid is de-energized. As the turbocharger controlled solenoid is de-energized, the magnitic field in the solenoid collapses producing voltage. The diode 18 permits the voltage of the collapsing field to be fed back into the solenoid. The voltage delays the release of the turbocharger control solenoid 19. As a result, the turbocharger produces a higher boost pressure and causes the engine to produce more horsepower.

The diode 18 is reverse biased by the ECM voltage and is therefore transparent to the ECM. When the ECM attempts to turn off the turbocharger control solenoid the magnetic field of the solenoid collapses. This collapse of the solenoid causes a reverse polarity high voltage across the solenoid. This voltage causes the diode to forward bias and allows current to flow through the diode, back to the other side of the solenoid.

The degree of extension of the "on" pulse may be controlled by selecting the desired switch on voltage level of the diode. For example a Schottky barrier diode having a switch on voltage of 0.2 volts DC provides maximum utilization of the voltage obtained from the collapsing of the magnetic field and provides the greatest extension of the "on" pulse. If the "on" pulse is overextended spark knock may occur as a result of overboost.

With the potential for optimization of turbocharging presented by the invention, environmental factors such as the temperature of the air, or ambient air pressure may require adjustment of the retrofit turbocharger booster. The extension of the "on" pulse may be lessened by adding additional diodes in series to prevent overboost, as shown in FIG. 2a. A limited amount of turbocharger boost can be added without encountering problems necessitating such fine adjustments.

The apparatus of the present invention is simply installed by means of connectors 12 and 13. The connector 12 corresponds to the connector on the wastegate control solenoid and the male connector 13 corresponds to the plug in connector of the wastegate control solenoid. Thus, the retrofit turbocharger booster of the present invention can be installed in seconds when an additional boost in horsepower is desired or quickly removed for normal operation.

It is also anticipated that the turbocharger booster may also include a switch (not shown) in the circuit including the diode and between wires 15 and 16. The switch permits the turbocharger booster 10 to be connected to the ECM and solenoid or disconnected. The switch would permit the diode 18 to be disconnected when it is not desired to use the turbocharger booster and connected when the additional boost is required.

Referring now to FIG. 3, the performance improvement achieved is shown as a chart wherein boost pressure is shown as a function of engine speed in rpms at full throttle for the normal boost pressure by curve 48 and for the improved boost pressure by curve 50. Between 2000 and 3000 rpms, the improved boost pressure increases at a greater rate than a normal boost pressure curve. The maximum boost pressure achieved with the booster of the present invention is approximately 4 psi greater than when a turbocharger is used without the invention. At about 3000 rpms the improved boost pressure is gradually reduced but remains somewhat higher than the normal boost pressure.

Figure 5:
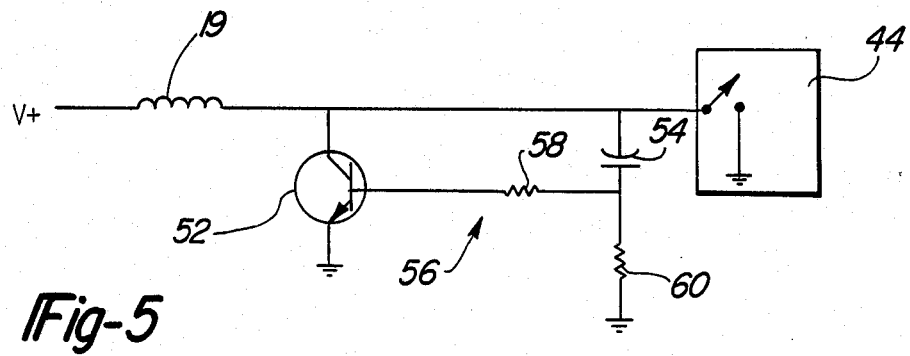
FIG. 5 is a electrical schematic diagram showing an alternative embodiment of the retrofit turbocharger booster.

Referring now to FIG. 5, the control circuit for an alternative embodiment of the turbocharger booster is shown. The ECM 44 is shown as a switch controlled ground of the solenoid 19. Transistor 52 is connected to one conductor of the solenoid. The transistor 52 is normally off when the solenoid 19 is connected to ground through the ECM 44. When the ECM interrupts the ground path, the voltage spike from the collapse of the magnetic field passes through a capacitor 54 in alternate ground circuit 56. The capacitor blocks the normal DC voltage, except for the duration of the voltage spike when the capacitor allows the voltage spike to switch on the transistor 52, grounding the solenoid 19. Resistor 58 is connected between the capacitor 54 and base of the transistor 52 to limit current. Resistor 60 grounds the base of the transistor 52 following passage of the voltage spike, turning the transistor off.

While the best mode for carrying out the invention has been described in detail, those familiar with the art to which this invention relates will recognize alternative ways of practicing this invention as defined by the following claims.

What is claimed:

1. A retrofit turbocharger booster for use in combination with an internal combustion engine having a turbocharger, the turbocharger having a compressor operatively connected to an exhaust turbine, an exhaust gas wastegate, a wastegate actuator, control means for providing a normal pulse train of on and off voltage, a wastegate control valve having a solenoid controlled manifold vacuum supply gate which shifts the wastegate actuator between a wastegate closed position when voltage is applied to the solenoid and a wastegate opened position when voltage is removed from the solenoid, the retrofit turbocharger booster comprising:

first and second conductors electrically connected to opposite poles of the solenoid respectively, said first conductor being electrically connected to a voltage source, and said second conductor being electrically connected to ground through the control means; and pulse modification means connected to at least one of said first and second conductors for extending the effective length of the on pulse portion of the pulsing voltage subsequent to generation of the pulse train by the control means, the extension being relative to said normal pulse train provided by the control means, said pulse modification means being effective to extend the effective length of the on pulse upon the change in the normal pulsing voltage from on to off.

2. The invention as defined in claim 1 wherein said pulse modification means comprises a switch means for continuing actuation of said solenoid in response to a voltage spike on said normal pulse train during the transition from on pulse to off pulse.

3. A turbocharger booster comprising:

a first connector having two leads and being adapted to receive a receptacle connector of a turbocharger wastegate control solenoid;

a second connector having two leads and being adapted to be received by a receptacle of a turbocharger wastegate control solenoid;

first and second conductors electrically connected on opposite ends each to one of the two leads of the first and second connectors;

control means for generating a digital pulse train of on pulses and off pulses responsive to predetermined turbocharger boost control requirements; and pulse train modifier means electrically interconnecting the first and second conductors for permitting current generated by the collapse of the magnetic field of the solenoid to flow back through the solenoid during the off pulses and for preventing current flow through the pulse train modifier during the on pulses, whereby the solenoid remains energized by the collapsing of the solenoid magnetic field increasing the duration of the energization of the solenoid without changing the digital pulse train generated by the control means.

4. The turbocharger booster of claim 3 wherein the modifier means is a diode.

5. The turbocharger booster of claim 4 wherein the diode has an actuation barrier of between 0.2 and 0.8 volts.

6. The turbocharger booster of claim 5 further comprising at least one additional diode connected in series with said diode to adjust the actuation barrier voltage to thereby provide a desired amount of increase in boost.

7. A retrofit turbocharger booster for use in combination with an internal combustion engine having a turbocharger, the turbocharger having a compressor operatively connected to an exhaust turbine, an exhaust gas wastegate, a wastegate actuator, control means for providing pulsing on and off voltage, a wastegate control valve, a manifold vacuum supply gate controlled by a solenoid, said waste gate control valve being shifted by the wastegate actuator between a wastegate closed position when voltage is applied to the solenoid and a wastegate opened position when voltage is removed from the solenoid, the retrofit turbocharger booster comprising:

first and second conductors electrically connected to the solenoid;

a diode electrically connected to the first and second conductors in parallel with the solenoid, said diode being reverse biased by the voltage applied by the control means.

8. The retrofit turbocharger booster of claim 7 wherein the diode has an actuation barrier of between 0.2 and 0.8 volts.

9. The retrofit turbocharger booster of claim 8 further comprising at least one additional diode connected in series with said diode to adjust the actuation barrier voltage to thereby provide a desired amount of increase in boost.

10. A retrofit turbocharger booster for use in combination with an internal combustion engine having a turbocharger, the turbocharger having a compressor turbine operatively connected to an exhaust turbine, an exhaust gas wastegate, a wastegate actuator, control means for generating a pulsing on and off voltage, a wastegate control valve having a solenoid controlled manifold vacuum supply gate which shifts the wastegate actuator between a wastegate closed position when voltage is applied to the solenoid and a wastegate opened position when voltage is removed from the solenoid, the retrofit turbocharger booster comprising:

first and second conductors electrically connected to opposite poles of the solenoid respectively, said first conductor being electrically connected to a voltage source, and said second conductor being electrically connected to ground through the control means; and pulse modification means in the form of a diode connected between said first and second conductors, for extending the effective length of the on pulse portion of the pulsing voltage, relative to the generated on pulse voltage, said diode being effective to extend the effective length of the on pulse dependent upon the change in the pulsing on and off voltage provided by the control means.

11. The retrofit turbocharger booster of claim 10 wherein the diode has an actuation barrier of between 0.2 and 0.8 volts.

12. The retrofit turbocharger booster of claim 11 further comprising at least one additional diode connected in series with said diode to adjust the actuation barrier voltage and thereby provide a desired amount of increase in boost.

* * * * *